Sept. 20, 1932.  M. WATTER  1,878,353
STEAM GENERATOR AND SPRAYER FOR BAKERY OVENS
Filed Sept. 28, 1931
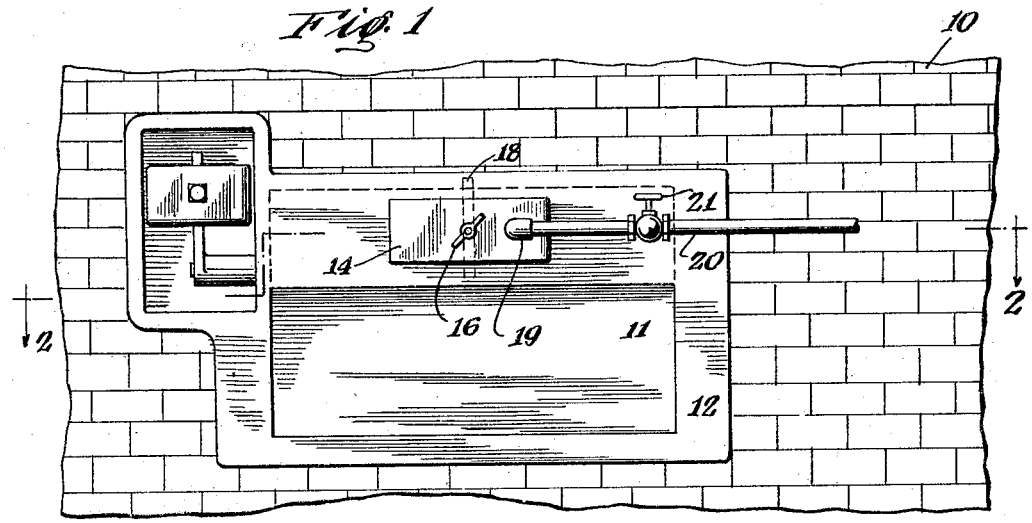
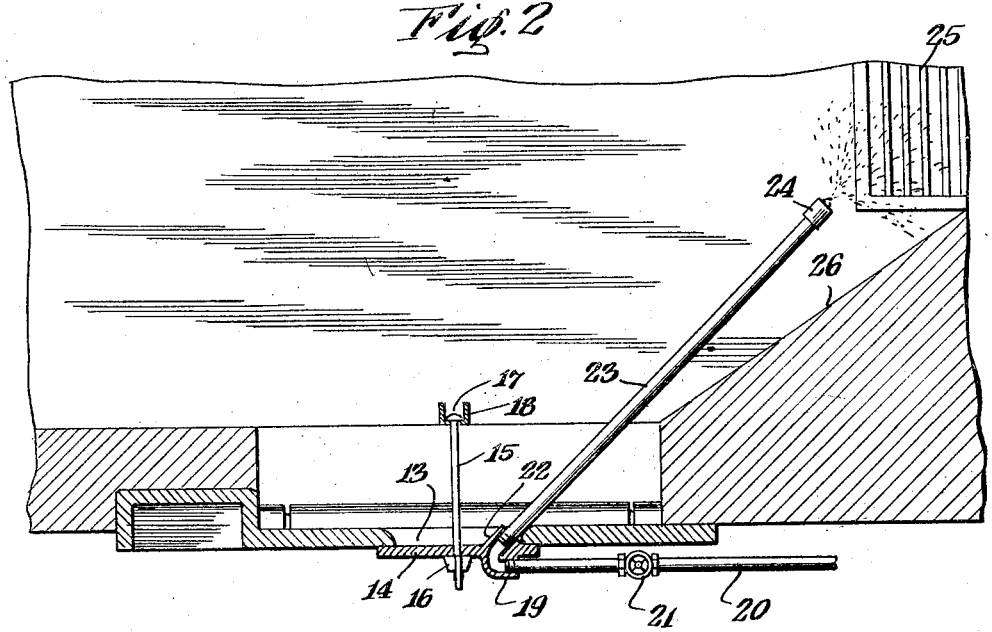
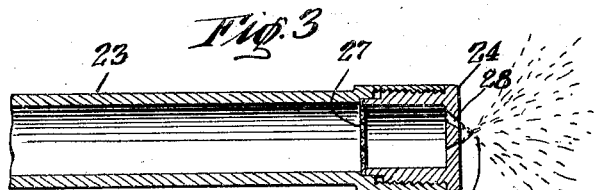
INVENTOR
Max Watter
BY
Gerry C. Heinicke
ATTORNEY Patented Sept. 20, 1932

1,878,353

UNITED STATES PATENT OFFICE

MAX WATTER, OF BROOKLYN, NEW YORK

STEAM GENERATOR AND SPRAYER FOR BAKERY OVENS

Application filed September 28, 1931. Serial No. 565,537.

This invention relates to improvements in bakery ovens, and particularly to a steam generator or producer and sprayer for such ovens, and it is the principal object of my invention to provide such a device, which can be readily installed in any oven even by persons unskilled in the art without material changes in the oven construction.

Another object of my invention is the provision of a steam producer and sprayer for bakery ovens in which a plate supporting the water supply pipes at a suitable angle thereto is readily secured by suitable means over the usual inspection opening of the oven door, or, if no such opening is present, over any other opening made in the door and held in place by appropriate means.

Still another object of my invention is the provision of a steam generator and sprayer for bakery ovens of utmost simplicity of construction, yet durable and highly efficient in operation.

A further object of my invention is the provision of a device of the above described character in which the water distributing pipe carrying the sprayer nozzle is arranged at an angle to its holder plate and led directly above the fire grate while its interior is equipped with a suitable strainer or screen to retain all impurities preventing clogging up of the nozzle.

A still further object of my invention is the provision of a steam generator and sprayer for bakery ovens, the nozzle of which has its body equipped with obliquely arranged bores producing jets of water mist meeting on the outside of the nozzle at an angle of substantially 45° to produce a forceful and extremely fine nebulous spray over the oven fire to be transformed into steam which is absolutely sanitary and adapted to raise the dough to the desired and necessary degree making it highly attractive and tasty.

These and other objects and advantages of my invention will become more fully known as the description thereof proceeds, and will then be specifically defined in the appended claims.

In the accompanying drawing, forming a material part of this disclosure:

Fig. 1 is a fragmentary front elevation of a bakery oven equipped with a steam producer and sprayer constructed according to my invention.

Fig. 2 is a plan view in section on line 2—2 of Figure 1.

Fig. 3 is a fragmentary longitudinal section through a nozzle used with my device.

As illustrated, a bakery oven 10, equipped with the customary oven door 11 in its frame 12 has an inspection opening 13. According to my invention, this opening is closed by a plate 14 held in place by means of a bolt 15, the front end of which is threaded and carries a wing nut 16, while its rear end is equipped with a head 17 engaged in a groove of the transverse bar 18 holding the plate in place upon the proper adjustment of the wing nut according to the thickness of the oven wall.

The plate 14 is provided near one of its ends with an outer nipple 19 into which one end of a water supply pipe 20 is screwed controlled by a gate valve 21.

The nipple 19 communicates with an inner socket 22 substantially at an angle of 45° to the plate and adapted for the reception of the outer end of a pipe 23 carrying at its inner end a spray nozzle 24 situated above the fire grate 25 near the inner obliquely arranged oven wall 26.

It will be clear that with ovens having the fire grate on the opposite side of the oven, the plate 14 need only to be turned to bring its nipple and socket pointing to this side with the sprayer pipe directed towards the fire grate.

The nozzle used with my novel and improved sprayer device is screwed upon the threaded end of the pipe 23, which contains a screen 27 for the retention of impurities carried by the water and nozzle 24 has its outer end wall provided with two or more bores 28 obliquely arranged in the end wall at an angle so as to provide jets of spray, meeting at an angle of substantially 45°, as indicated at 29 producing a forceful, well nebulized sprayer mist, adapted to be instantly transformed into steam by the heat of the oven fire, the nozzle being located directly above the grate.

It will be understood that I have disclosed the preferred form of my invention only as one example of the many possible ways to construct my device in practice, and that I may make such changes in its general arrangement and in the construction of the minor details thereof as come within the scope of the appended claims without departure from the spirit of my invention and the principles involved.

Having thus described my invention, what I claim as new and desire to secure by Letters Patent is:

1. A steam generator and sprayer, particularly for bakery ovens having a front door provided with an opening, a plate closing said opening, means for securing said plate in place, an outer socket formed with said plate, a valve controlled water supply pipe in said socket, an inner socket on said plate arranged at an angle of 45° to the inner wall thereof and in communication with the outer socket, a water delivery pipe screwed at one end into said inner socket, a screen or strainer in said delivery pipe, and a nozzle at the inner end of same.

2. The combination of a bakery oven having a front door provided with an opening with a means for providing by the oven heat a fine nebulous steam spray in the oven for raising the dough, said means comprising a plate closing the opening in the oven door, a bolt, a grooved transverse bar, a head on the rear end of said bolt engaged in the groove of said bar, a wing nut at the front end of said bolt for securing said plate in place, an outer nipple on said plate adapted to receive one end of valve controlled water supply pipe, an inner socket formed with said plate in communication with said nipple and adapted to receive a sprayer pipe, a screen in said pipe and a sprayer nozzle directly above the oven grate on the inner end of said pipe to supply a well nebulized sprayer mist adapted to be instantly transformed into steam by the heat of the oven fire.

Signed at New York, in the county of New York, and State of New York, this 26th day of September, A. D. 1931.

MAX WATTER.